United States Patent [19]
Chiarelli

[11] Patent Number: 6,065,783
[45] Date of Patent: May 23, 2000

[54] PIPE COUPLING

[76] Inventor: Phillip Anthony Chiarelli, 8412 Duckwood La., Charlotte, N.C. 28215

[21] Appl. No.: 08/997,568

[22] Filed: Dec. 23, 1997

[51] Int. Cl.[7] .............................. B23K 35/12; F16L 13/08
[52] U.S. Cl. ........................ 285/289.5; 285/915; 228/246; 228/214
[58] Field of Search ................................ 285/289.5, 915, 285/3, 287; 228/132, 246, 255, 254, 214, 224; 206/804

[56] References Cited

U.S. PATENT DOCUMENTS

| | | | |
|---|---|---|---|
| 1,840,414 | 1/1932 | Schulte | 285/289.5 |
| 1,901,820 | 3/1933 | Parker | 228/224 X |
| 1,986,010 | 1/1935 | O'Laughlin | 285/289.5 |
| 2,050,728 | 8/1936 | Ost | 285/289.5 |
| 2,055,276 | 9/1936 | Brownsdon | 285/289.5 |
| 2,224,145 | 12/1940 | Dugan | 285/289.5 X |
| 3,711,628 | 1/1973 | Hansson | 285/287 X |
| 3,894,674 | 7/1975 | Weill | 228/254 X |
| 3,963,162 | 6/1976 | Taguchi et al. . | |
| 3,985,280 | 10/1976 | Yamaji et al. . | |
| 4,019,512 | 4/1977 | Tenczar | 285/3 X |
| 4,089,453 | 5/1978 | Jenkins . | |
| 4,396,213 | 8/1983 | Hawkins . | |
| 4,465,309 | 8/1984 | Nimke et al. . | |
| 4,667,869 | 5/1987 | Gen et al. | 228/224 X |
| 4,923,110 | 5/1990 | Carmicael et al. | 228/214 |
| 5,150,931 | 9/1992 | Hagio et al. . | |
| 5,227,596 | 7/1993 | McGaffigan et al. . | |

FOREIGN PATENT DOCUMENTS

| | | | |
|---|---|---|---|
| 2362926 | 6/1974 | Germany | 285/915 |

*Primary Examiner*—Anthony Knight
*Attorney, Agent, or Firm*—Adams Law Firm, P.A.

[57] ABSTRACT

A pipe coupling joins together adjacent metal pipe segments. The pipe coupling includes a hollow metal body having first and second open ends adapted for receiving respective proximal ends of the adjacent pipe segments. At least one solder groove is formed along an inside surface of the body. A solder alloy is embedded in the solder groove, and is adapted to flow between the body and the adjacent pipe segments when heated. Upon subsequent cooling, the solder alloy joins the adjacent pipe segments and coupling together.

5 Claims, 4 Drawing Sheets

PIPE COUPLING

TECHNICAL FIELD AND BACKGROUND OF THE INVENTION

This invention relates generally to a pipe coupling, and more specifically, to a pipe coupling containing a preexisting solder alloy. The invention is readily and conveniently applied to proximal ends of adjacent pipe segments to join the pipe segments together by melting and then cooling the solder alloy. The invention is especially applicable for use by homeowners for repairing household plumbing without the services of a professional plumber.

According to one prior art coupling described in U.S. Pat. No. 5,150,931 issued to Hagio et al. ('931 Patent), a pair of metallic ring members of relatively low melting point are located inside the coupling adjacent opposite sides of a centrally-disposed interior stop ring. The stop ring is provided to properly space the ends of the adjacent pipe segments within the coupling. When the coupling is heated, the metallic members are intended to melt and flow between the coupling and pipe segments. Upon subsequent cooling, the metallic members re-solidify to join the pipe segments together.

The coupling of the '931 Patent has a number of disadvantages. For example, because the interior metallic ring members are intended to reside directly adjacent the mouth of each pipe segment to be joined, a certain amount of molten metal will likely flow outside the space between the coupling and pipe segments. Any metal solidifying inside the pipe segments or along the circumference of the stop ring would restrict the flow of fluid through the pipe segments. Furthermore, unless the proximal ends of the pipe segments entirely abut the metal rings, the resulting seal between the pipe segments and coupling will likely be faulty.

The present invention overcomes these and other problems of the prior art by providing a pipe coupling which conveniently and properly joins together adjacent segments of metal pipe. When heated, a molten alloy embedded in the interior wall of the coupling contacts the exterior walls of the pipe segments, and upon subsequent cooling, re-solidifies to seal the joint between the pipe segments.

SUMMARY OF THE INVENTION

Therefore, it is an object of the invention to provide a pipe coupling which includes a pre-applied solder alloy embedded in its interior wall.

It is another object of the invention to provide a pipe coupling which readily and conveniently joins together adjacent segments of metal pipe.

It is another object of the invention to provide a pipe coupling which does not require separate purchase and application of a solder alloy and soldering flux.

It is another object of the invention to provide a pipe coupling which includes a predetermined amount of solder alloy and soldering flux.

It is another object of the invention to provide a pipe coupling with a tapered center portion which provides a stop for properly positioning within the coupling the ends of the pipe segments to be joined.

It is another object of the invention to provide a pipe coupling which is applicable for use by homeowners for repairing household plumbing without the services of a professional plumber.

It is another object of the invention to provide a pipe coupling which is relatively inexpensive to manufacture.

It is another object of the invention to provide a pipe coupling which allows convenient connection of adjacent pipe segments in a tight spaces.

It is another object of the invention to provide a pipe coupling which reduces the field time required for repairs made by a professional plumber.

It is another object of the invention to provide a pipe coupling which is applicable for use with any standard piping.

These and other objects of the present invention are achieved in the preferred embodiments disclosed below by providing a pipe coupling for joining together adjacent metal pipe segments. The pipe coupling includes a hollow metal body having first and second open ends adapted for receiving respective proximal ends of the adjacent pipe segments. At least one solder groove is formed along an inside surface of the body. A solder alloy is embedded in the solder groove, and is adapted to flow between the body and the adjacent pipe segments when heated. Upon subsequent cooling, the solder alloy joins the adjacent pipe segments and coupling together.

According to one preferred embodiment of the invention, the at least one solder groove includes first and second annular solder grooves.

According to another preferred embodiment of the invention, the first and second annular solder grooves are formed proximate respective first and second open ends of the body.

According to yet another preferred embodiment of the invention, the body is a generally linear metal pipe fitting.

According to yet another preferred embodiment of the invention, the body is an angled metal pipe fitting.

According to yet another preferred embodiment of the invention, the solder alloy is an alloy of zinc and copper.

According to yet another preferred embodiment of the invention, the solder alloy is an alloy of tin and lead.

According to yet another preferred embodiment of the invention, a soldering flux is applied to the inside surface of the body adjacent the solder groove for aiding the flow of the alloy between the body and the adjacent pipe segments.

According to yet another preferred embodiment of the invention, first and second protective covers are positioned over respective first and second open ends of the body to prevent contamination of the soldering flux prior to application of the coupling to the adjacent pipe segments.

According to yet another preferred embodiment of the invention, the first and second protective covers are formed of cellophane.

According to yet another preferred embodiment of the invention, each of the first and second protective covers includes a pull tab for removing the cover from the open end of the body.

According to yet another preferred embodiment of the invention, the body includes first and second enlarged collars formed, respectively, at its first and second open ends.

In another embodiment, the pipe coupling includes a hollow metal body having first and second open ends adapted for receiving respective proximal ends of the adjacent pipe segments, and first and second enlarged collars formed around the first and second open ends. First and second annular solder grooves are formed along an inside surface of respective first and second enlarged collars. A solder alloy is embedded in the first and second solder grooves, and is adapted to flow between the body and the adjacent pipe segments when heated. Upon subsequent cooling, the solder alloy joins the adjacent pipe segments and coupling together.

In yet another embodiment, the pipe coupling includes a hollow metal body having first and second open ends adapted for receiving respective proximal ends of the adjacent pipe segments, and first and second enlarged collars formed around the first and second open ends. First and second annular solder grooves are formed along an inside surface of respective first and second enlarged collars. A solder alloy is embedded in the first and second solder grooves, and is adapted to flow between the body and the adjacent pipe segments when heated. Upon subsequent cooling, the solder alloy joins the adjacent pipe segments and coupling together. A soldering flux is applied to the inside surface of the body adjacent each of the first and second solder grooves for aiding the flow of the alloy between the body and the adjacent pipe segments. First and second protective covers are positioned over respective first and second open ends of the body to prevent contamination of the soldering flux prior to application of the coupling to the adjacent pipe segments. Each of the protective covers including a pull tab for removing the cover from the end of the pipe segment.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
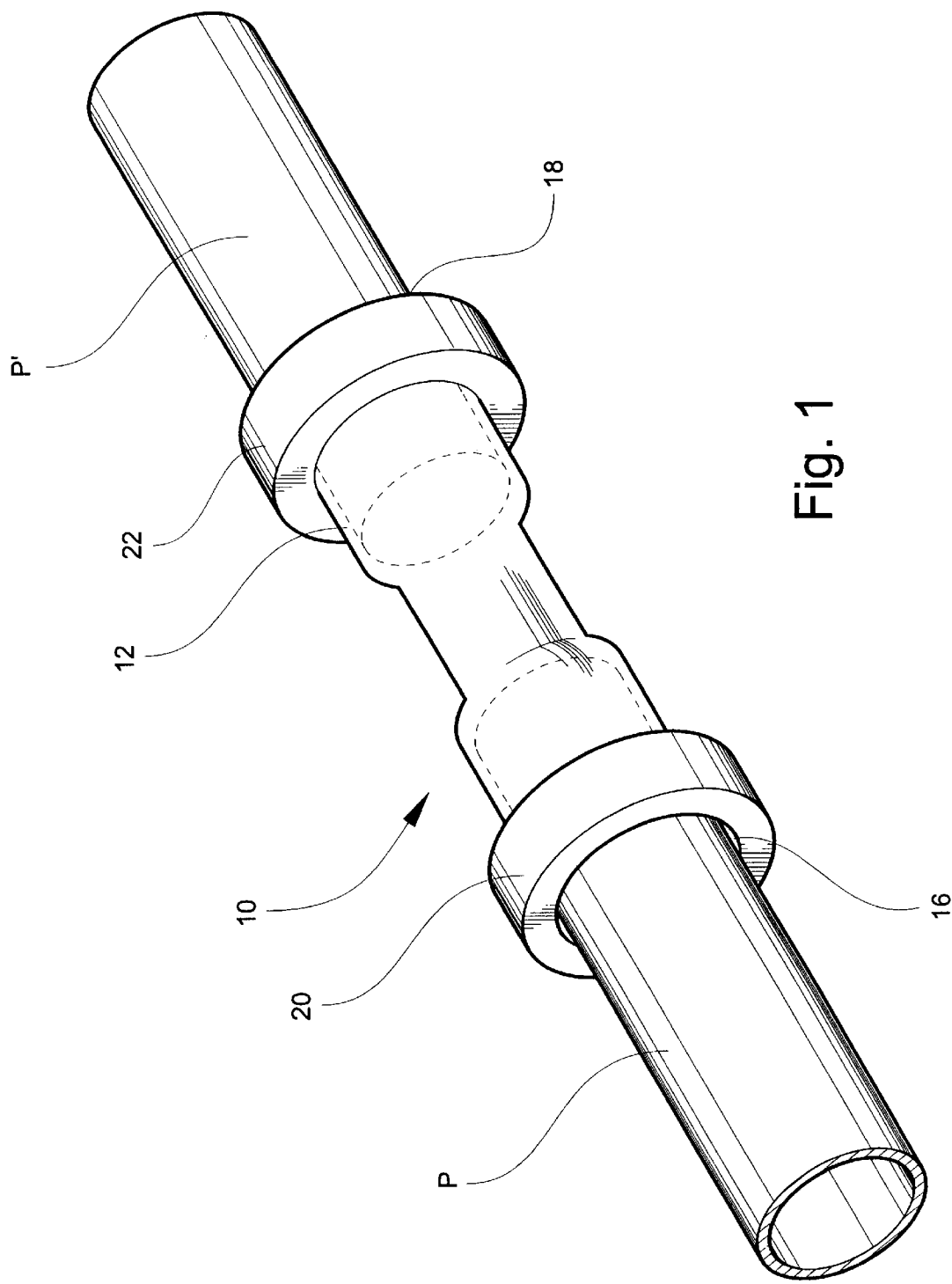
FIG. 1 is an environmental perspective view of the pipe coupling according to one preferred embodiment of the invention, and showing the pipe coupling joining together adjacent segments of metal pipe.

Referring now specifically to the drawings, a pipe coupling according to the present invention is illustrated in FIG. 1 and shown generally at reference numeral 10. The pipe coupling 10 is formed of a metal, such as copper, and is applicable for joining together adjacent segments of metal pipe, P and P'. The pipe coupling 10 is especially useful to home owners in the repair and maintenance of copper plumbing without requiring the services of a professional plumber.

Figure 2:
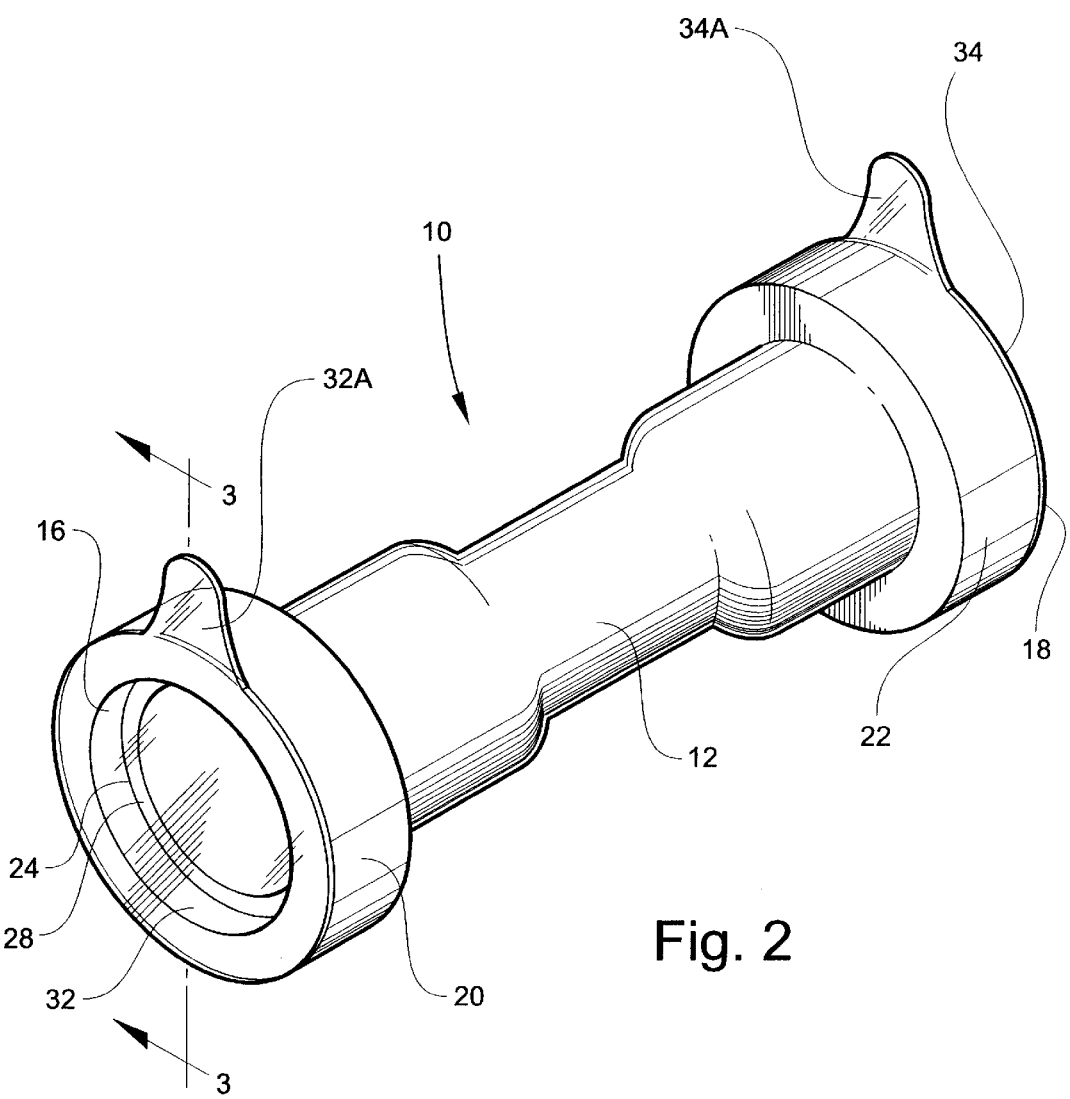
FIG. 2 is an enlarged perspective view of the pipe coupling prior to installation.
Figure 3:
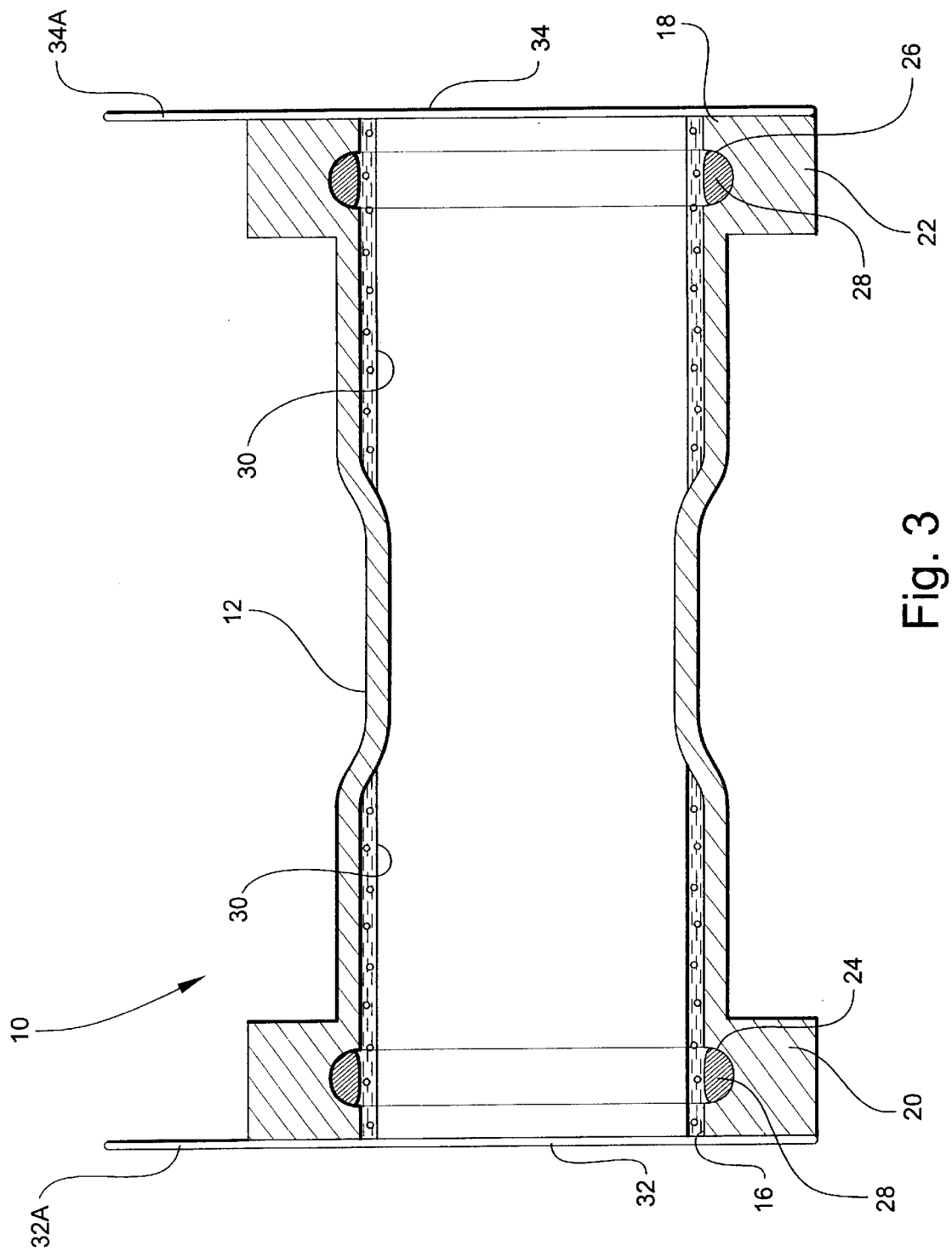
FIG. 3 is a cross-sectional view of the pipe coupling taken along line 3—3 of FIG. 2.

Referring to FIGS. 1, 2, and 3, the pipe coupling 10 includes a hollow metal body 12 having opposed, open ends 16 and 18 adapted for receiving respective proximal ends of the pipe segments P and P'. A central portion of the body 12 is preferably slightly tapered to provide stops for spacing the ends of the pipe segments P and P' received into the open ends 16 and 18. Enlarged collars 20 and 22 are formed with each of the open ends 16 and 18 of the body 12 and include respective interior solder grooves 24 and 26 for storing a solder alloy 28 of, for example, zinc and copper or tin and lead. The solder alloy 28 preferably resides along the entire interior circumference of each collar 20 and 22 to ensure a complete and proper seal between the coupling 10 and pipe segments P and P' when heated. The enlarged radial thickness of the collars 20, 22 allows for the formation of relatively deep grooves without weakening the structure of the coupling 10. The solder alloy 28 is preferably entirely embedded within the solder grooves 24 and 26 such that the alloy 28 does not interfere with the initial application of the coupling 10 to the adjacent pipe segments P and P'.

As shown in FIG. 3, a soldering flux 30 is pre-applied to an interior surface area of the body 12 adjacent each of the solder grooves 24 and 26. The soldering flux 30 is a chemical substance which aids the flow of the solder alloy 28, when heated, and serves to remove and prevent the formation of oxides on the pipe segments P and P'. Disposable protective covers 32 and 34 are positioned over the open ends 16 and 18 of the coupling body 12 to prevent contamination of the soldering flux 30 prior to application of the pipe coupling 10 to the adjacent pipe segments P and P'. The covers 32 and 34 are preferably formed of cellophane and include respective pull tabs 32A and 34A for allowing convenient removal.

To install the pipe coupling 10, the user first removes each of the protective covers 32 and 34 and slides one open end 16, 18 of the coupling 10 onto a proximal end of one of the adjacent pipe segments P, P' to be joined together. The proximal end of the second adjacent pipe segment P, P' is inserted into the other open end 16, 18 of the coupling 10. A small, hand-held blowtorch is then used to heat each of the collars 20, 22 causing the solder alloy 28 to melt and flow between the coupling body 12 and the adjacent pipe segments P and P'. Upon subsequent cooling, the solder alloy 28 re-solidifies and joins the adjacent pipe segments P, P' and coupling 10 together.

Figure 4:
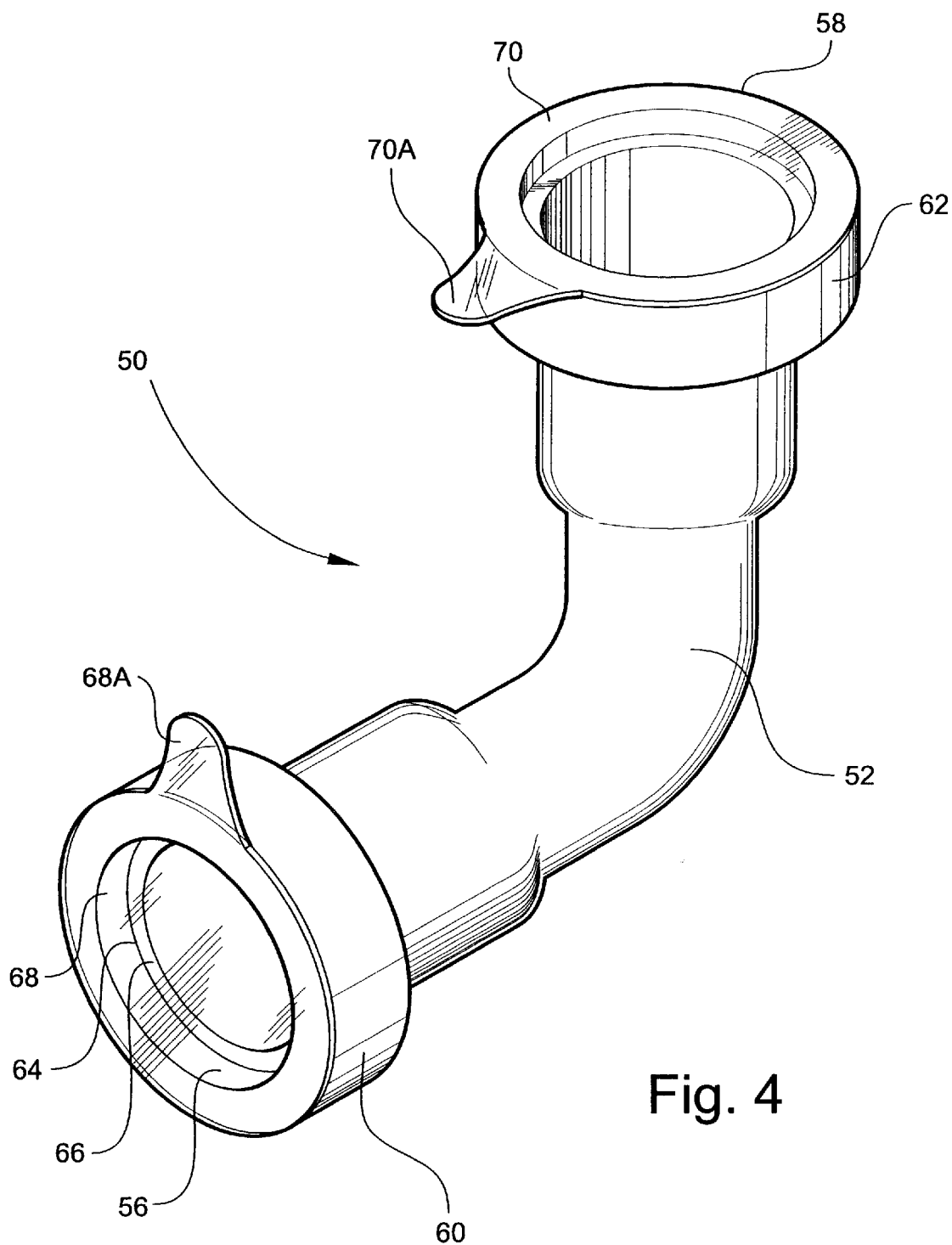
FIG. 4 is a perspective of the pipe coupling according to an alternative embodiment of the invention.

A second embodiment of a pipe coupling 50 applicable for joining together adjacent segments of metal pipe is shown in FIG. 4. The pipe coupling 50 includes a hollow metal body 52 formed at a right angle, and having open ends 56 and 58 adapted for receiving respective proximal ends of the pipe segments. Enlarged collars 60 and 62 are formed with each of the open ends 56 and 58 of the body 52 and include respective interior solder grooves 64 for storing a solder alloy 66, as described above. The solder groove formed in the collar 62, not shown in FIG. 4, is identical to that formed in the collar 60.

A soldering flux (not shown) is pre-applied to an interior surface area of the body 52 adjacent each of the solder grooves 64. Disposable protective covers 68 and 70 are positioned over the open ends 56 and 58 of the coupling body 52 to prevent contamination of the soldering flux prior to application of the pipe coupling 50 to the adjacent pipe segments. The covers 68 and 70 are preferably formed of cellophane and include respective pull tabs 68A and 70A for allowing convenient removal.

A pipe coupling is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A pipe coupling for joining together adjacent metal pipe segments, said pipe coupling comprising:

(a) a hollow metal body having first and second open ends adapted for receiving respective proximal ends of the adjacent pipe segments, and first and second enlarged collars formed around said first and second open ends;

(b) first and second annular solder grooves formed along an inside surface of respective first and second enlarged collars;

(c) a solder alloy embedded in said first and second solder grooves, and adapted to flow between said body and the adjacent pipe segments when heated, such that upon subsequent cooling, the solder alloy joins the adjacent pipe segments and coupling together;

(d) a soldering flux pre-applied to the inside surface of said body adjacent each of said first and second solder grooves for aiding the flow of said alloy between said body and the adjacent pipe segments; and (e) first and second removable protective covers positioned over respective first and second open ends of said body to prevent contamination of said soldering flux prior to application of the coupling to the adjacent pipe segments, and each of said protective covers including a pull tab for removing the cover from the end of the pipe segment.

2. A pipe coupling according to claim 1, wherein said first and second enlarged collars are integrally-formed with respective open ends of said body.

3. A pipe coupling according to claim 1, wherein said first and second protective covers are formed of cellophane.

4. A pipe coupling according to claim 1, wherein said body comprises a generally linear metal pipe fitting.

5. A pipe coupling according to claim 1, wherein said body comprises an angled metal pipe fitting.

* * * * *